Figure 4:
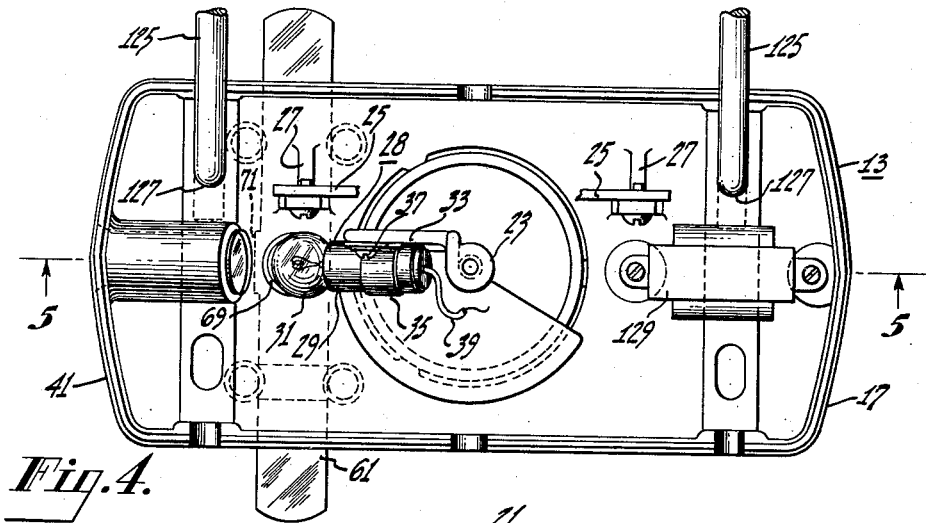

Oct. 5, 1954
J. F. BYRD ET AL
2,691,160
ILLUMINATING AND SIGNALING DEVICE FOR
OUTDOOR AUTOMOBILE DRIVE-IN THEATRES
Filed March 31, 1949
3 Sheets-Sheet 1
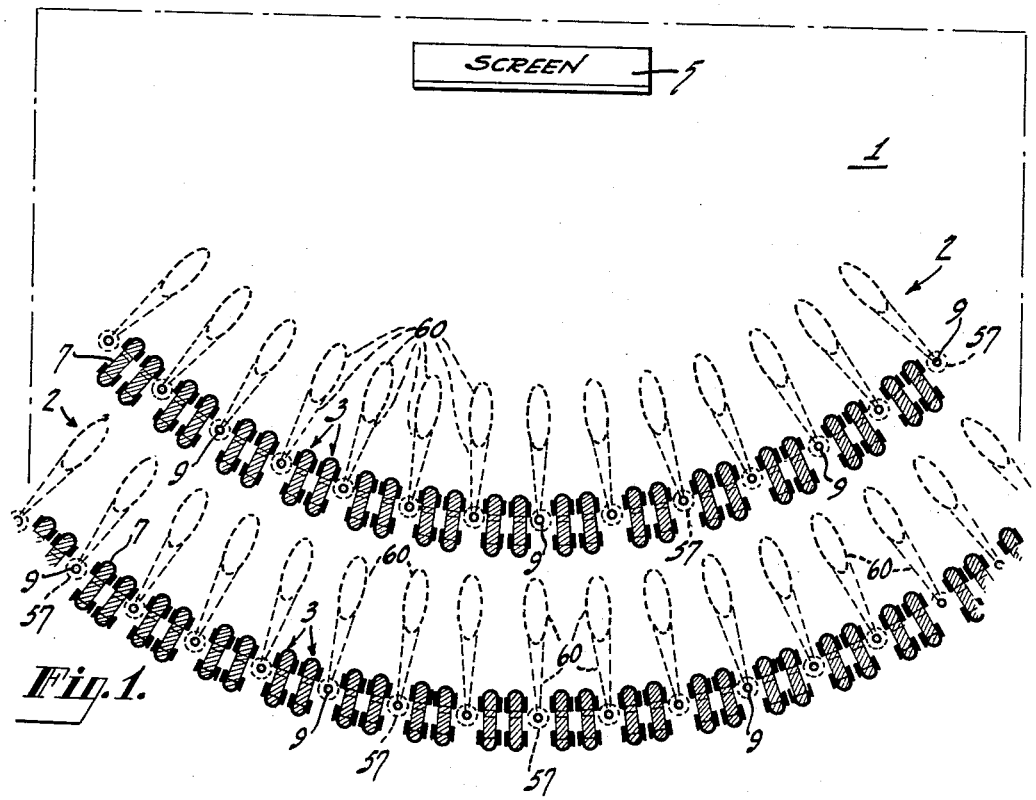
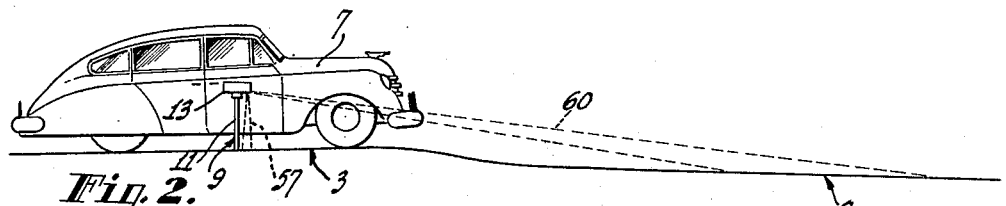
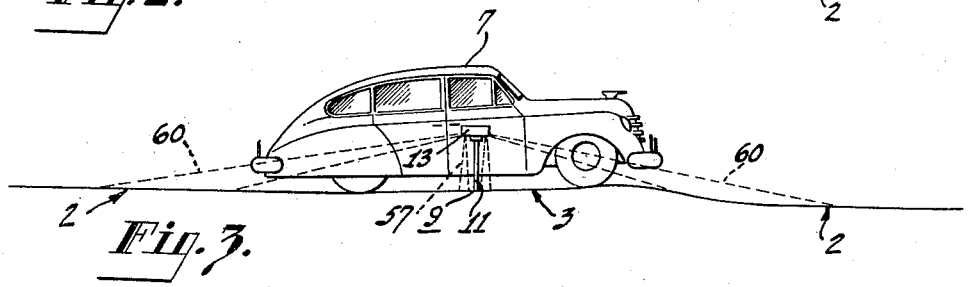
INVENTORS
JOHN F. BYRD AND
JAMES D. PHYFE
BY Morris Kahn
ATTORNEY Oct. 5, 1954

J. F. BYRD ET AL 2,691,160

ILLUMINATING AND SIGNALING DEVICE FOR
OUTDOOR AUTOMOBILE DRIVE-IN THEATRES

Filed March 31, 1949

3 Sheets-Sheet 2

INVENTORS
JOHN F. BYRD AND
JAMES D. PHYFE

BY

ATTORNEY

Oct. 5, 1954
J. F. BYRD ET AL
2,691,160
ILLUMINATING AND SIGNALING DEVICE FOR
OUTDOOR AUTOMOBILE DRIVE-IN THEATRES
Filed March 31, 1949
3 Sheets-Sheet 3
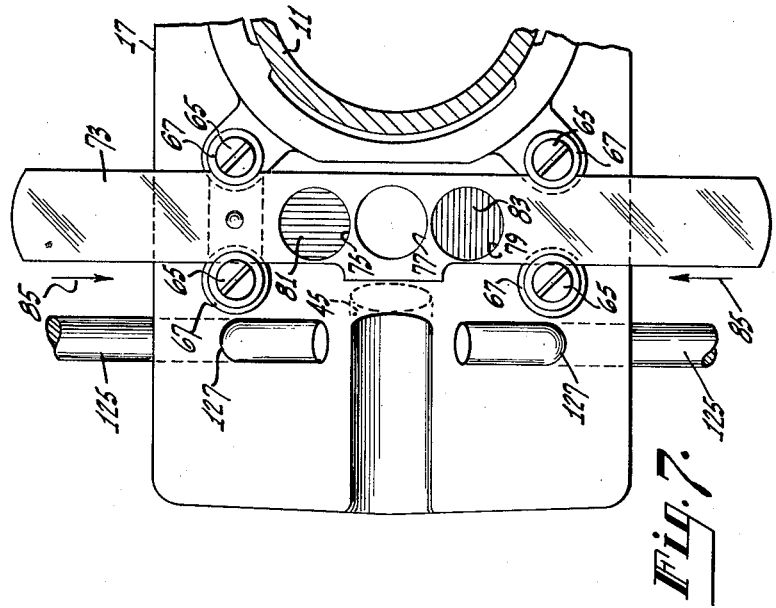
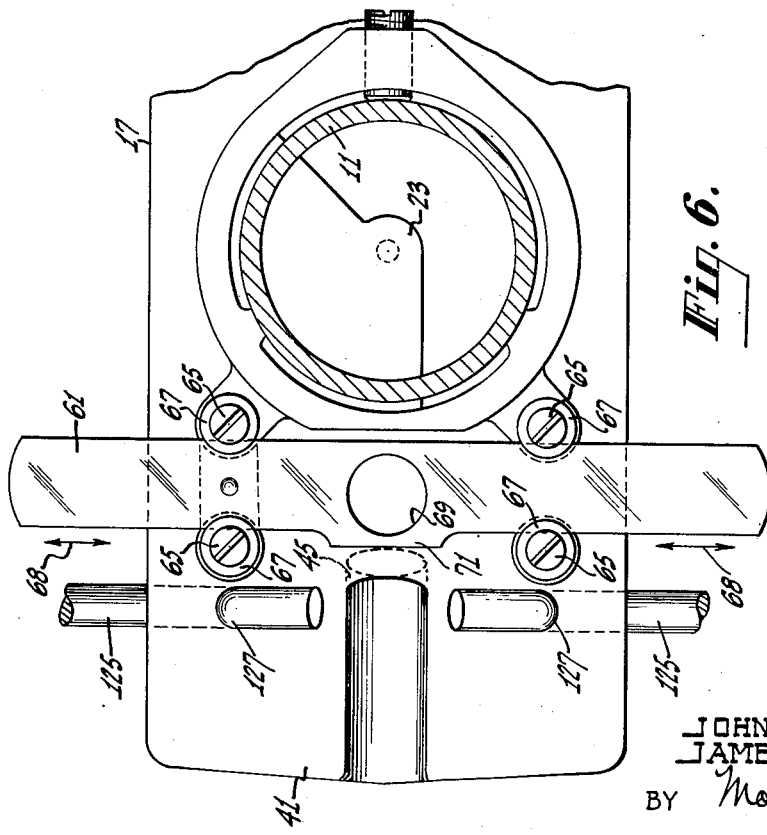
INVENTORS
JOHN F. BYRD AND
JAMES D. PHYFE
BY Morris Rabin
ATTORNEY Patented Oct. 5, 1954

2,691,160

UNITED STATES PATENT OFFICE 2,691,160

ILLUMINATING AND SIGNALING DEVICE FOR OUTDOOR AUTOMOBILE DRIVE-IN THEATERS

John F. Byrd, Ashland, and James D. Phyfe, Moorestown, N. J., assignors to Radio Corporation of America, a corporation of Delaware Application March 31, 1949, Serial No. 84,704

14 Claims. (Cl. 340—310)

This invention relates to a lighting device for outdoor automobile drive-in theatres, and more particularly to a combination illuminating device for the driveways and signalling means for attracting the attention of a concession attendant.

In the operation of automobile drive-in theatres, it is necessary to provide illumination for the parking area which will permit patrons to see the driveways and stalls or parking spaces without the use of their automobile headlights, and yet not be too bright so that it will interfere with the performance or be otherwise disturbing to the patrons. In general, prior art illuminating systems and devices in use at present are of a type in which a light is supported on a very high tower or pole, the light being directed downwardly and casting a rather dim illumination or moonlight effect over the entire parking area. Systems such as these have several disadvantages, among them being that the illumination is either not sufficient to illuminate the driveways, or it is too bright and consequently interferes with the performance or otherwise disturbs the patrons. In addition, since the light must be supported on a tower or pole, the structure in most cases is of such a height that it constitutes a hazard to aviation, and, according to government regulations, it is required that a warning light be placed on the top thereof. With this arrangement, the lights are not only difficult to service, but the warning lights must be maintained and serviced throughout the year, even though the theatre is not in use during the winter months.

In many drive-in theatres, vending concessions are granted, and in most cases no provision is made for attracting the attention of the vendor, with the result that the vendor is required to solicit the occupants of each automobile. This, of course, is disturbing to the occupants not desiring service.

The primary object of our present invention is to provide an improved illuminating system for automobile drive-in theatres which will eliminate the above as well as other disadvantages of prior art illuminating systems.

It is also an object of our invention to provide a combination illuminating device and concession signal for drive-in theatres.

A further object of our invention is to provide a combination illuminating device, concession signal, and loudspeaker support for drive-in theatres.

A still further object of our invention is to provide an improved system of illumination for automobile drive-in theatres which will assist the driver of an automobile in following the driveways.

It is another object of our invention to provide an improved illuminating device for lighting the driveways and for indicating the stalls or parking spaces in order to facilitate parking an automobile adjacent to a loudspeaker station.

Another object of our invention is to provide an improved lighting and signalling device which may be quickly and easily installed and which may be readily serviced and maintained.

In accordance with our present invention, we provide an illuminating and signalling device for automobile drive-in theatres which comprises a housing adapted to be mounted on a support located between adjacent pairs of automobile stalls. The housing, which comprises a base portion and a cover portion, has a light source disposed in its interior. Separate openings are provided in the base portion with a lens mounted in each opening, one of the lenses projecting a beam of light downwardly around the base of the support, and the other lens projecting a beam of light at an acute angle to the first mentioned light beam and illuminating a small area of ground in the driveway adjacent the respective stalls. The light source is adjustable with respect to the lenses so that the spots of light on the driveways may be adjusted to delineate a path along the driveways for guiding the driver of an automobile. A signalling device in the form of a light filter is movably attached to the base and is adapted to be brought into registry with one of the openings for the purpose of giving a distinctive signal to thereby attract the attention of the concession attendant when service is desired. In the event the sound system of the drive-in theatre is one which employs individual loudspeakers which are to be placed in the respective automobiles, the illuminating device may be arranged to provide a suitable support and connection for the loudspeakers, the electrical wiring being incorporated in a common wiring system connecting the respective stations, if desired.

Figure 5:
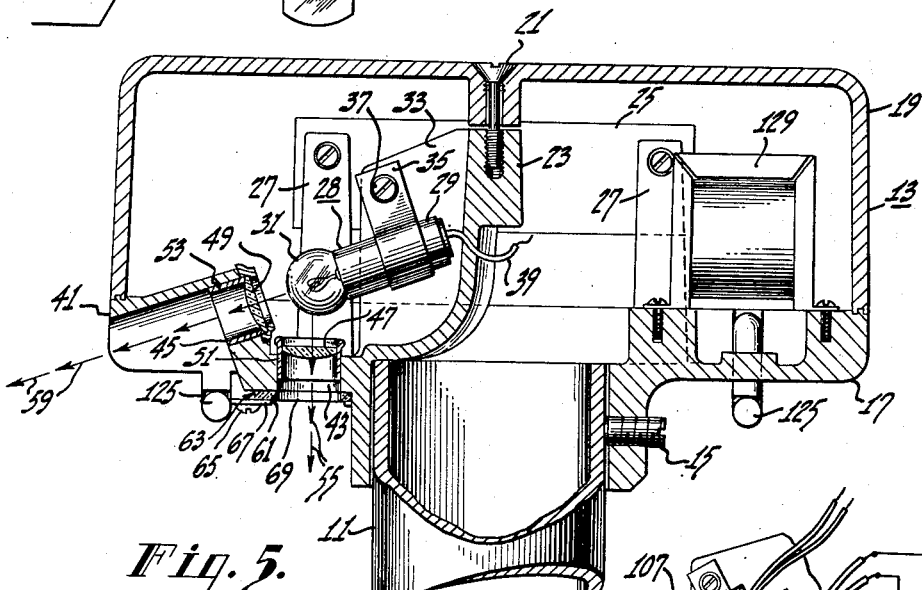
Figures 8, 9:
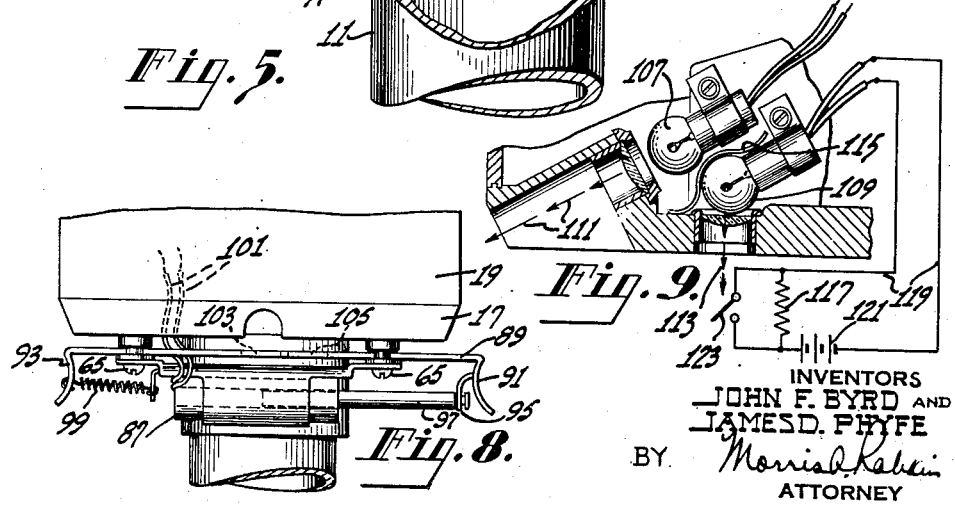

The novel features of our invention, as well as additional objects and advantages thereof, will be better understood from the following detailed description of several embodiments thereof when read in connection with the accompanying drawing, in which Figure 1 is a plan view of an outdoor automobile drive-in theatre provided with a lighting system employing illuminating devices in accordance with our invention, the light beams for the driveways being shown directed forwardly, Figure 2 is an enlarged side view of one of the illuminating devices illustrated in Figure 1 showing its position with respect to an automobile parked in one of the stalls, the beam of light being shown projected forwardly to illuminate a portion of the driveway in front of the stall, Figure 3 is a side view similar to Figure 2 showing a second embodiment of the illuminating device wherein separate beams of light are projected on the driveways in front and back of the automobile stalls, Figure 4 is an enlarged, plan view of the illuminating device shown in Figure 2 with the housing cover removed, and showing portions of the loudspeaker supports connected to the base thereof, Figure 5 is a side view in section of the illuminating device shown in Figure 4, taken on the line 5—5, and including the housing cover and a portion of the pedestal or support, Figure 6 is an enlarged bottom view of a portion of the base of the illuminating device illustrated in Figure 4 showing a manually operable transparent signal slide, Figure 7 is a view similar to Figure 6 but showing a modified form of signal slide, Figure 8 is a fragmentary end view of an illuminating device provided with a magnetically operated signal slide, and Figure 9 is a fragmentary side view of an illuminating device provided with an electrically controlled signal.

Referring more particularly to the drawing, wherein similar reference characters designate corresponding parts throughout, there is shown, in Figure 1, an outdoor automobile drive-in theatre 1, comprising alternate rows of driveways 2 and stalls or parking spaces 3 arcuately arranged with respect to a stage or motion picture projection screen 5.

The stalls 3 are adapted to receive automobiles 7 for parking adjacent to each other and facing the screen 5. In most cases, the stalls are somewhat vertically inclined upwardly toward the screen, as illustrated in Figures 2 and 3, and the screen 5 is considerably elevated from the ground so that patrons may view the performance from the seats of their automobiles, through the windshield thereof, free of obstruction or interference from other automobiles which may be using the driveways, or which may be parked in stalls between the screen and their own automobiles.

In order that sound from the sound system may be effectively heard by the patrons, loudspeakers are disposed at stations 9 adjacent each of the stalls 3, being located either in a position at the forward end of the stall so that the speaker will be directly in front of a parked automobile, or on supports between adjacent pairs of stalls. In the latter case, the loudspeaker is usually arranged so that it may be removed from its support and placed within the automobile of the user thereof, as more particularly disclosed in the copending application of James D. Phyfe, Ser. No. 585,830, filed March 31, 1945, now Patent No. 2,468,986. The illuminating device of our present invention is particularly adapted for use with this latter type of sound system and may be quickly and easily combined therewith.

Each of the stations 9, located between adjacent pairs of stalls 3, comprises a pedestal or support 11 on top of which there is disposed a housing or illuminating device 13 which is securely fastened to the support by means of a set screw 15, or any other suitable means. The housing 13 comprises a base 17 and a removable cover 19, the latter being provided with a screw or bolt 21 adapted to engage a central extension 23 of the base 17 to thereby securely fasten the cover to the base. A terminal board 25 is disposed within the housing 13, being mounted on the base 17 by means of a pair of supports 27. A light source 28, comprising a socket 29 and an electric light bulb 31, is also disposed within the housing 13, and is adjustably supported on a rib 33 of the central extension 23 by means of a strap clamp 35 and screw 37, the socket 29 having electrical connection with the terminal board 25 by means of a lead 39.

In one end 41 of the housing 13, two apertures 43, 45 are provided through which light is projected in separate beams from the common light source 28. Lenses 47, 49 are mounted, respectively, in the apertures 43, 45 by means of holders 51, 53 which are securely retained in the apertures by any suitable means. While the lens 47 shown in Figure 5 of the drawing is a planoconvex lens, this, however, is not essential and a plain, flat lens may be used if desired. The lens 47 is disposed with its axis (shown by arrows 55) substantially vertical so that a beam of light will be projected thereby vertically downwardly to illuminate a portion of the pedestal or support 11, as well as a relatively small area of ground about the base of the pedestal, as indicated by the broken line outline 57 in Figures 1 through 3. The lens 49 is disposed with its axis (shown by arrows 59) at an acute angle to the axis of the lens 47 so that a beam of light will be projected by the lens 49 at an acute angle to the vertical light beam to thereby illuminate a comparatively small area of ground on the driveway to which it is directed, as shown by the broken line outline 60 in Figures 1 through 3.

The axes of both lenses 47, 49 intersect at a point within the housing, and the light source 28 is disposed substantially at that point of intersection so that it may provide a common source of light for both beams. However, it will be observed from Figures 4 and 5 that the longitudinal axis of the socket 29 and light bulb 31 substantially coincides with the axis of the lens 49. Simply by loosening the screw 37, the light bulb 31 may then be moved toward or away from the lens 49, along the latter's axis, thereby permitting adjustment of the size of the spot of light on the driveway. On the other hand, it will also be observed that the socket is rotatable about the screw 37. As a result, the light bulb 31 may be moved in an arc which raises and lowers the bulb with respect to the lens 49. This latter movement will cause the beam of light 60 to move in a vertical plane and thus the spot of light on the driveway may be adjusted with respect to its distance from the station 9. In this manner, all of the stations 9 may be adjusted so that the series of spots of light which are projected on the driveway can be aligned along the center line of the driveway to thereby assist the driver of an automobile in following the path provided by the driveway. Although the housing is of such design that the light is sufficiently shielded, in most circumstances it will also be located in a position below the level of the windows of the parked automobiles, and therefore the light will not be bothersome to patrons.

While the illuminating device 13, illustrated in Figures 1 and 2, is shown with the driveway beam directed on the driveway in front of the stalls, it will, of course, be recognized that the device may be utilized in a reverse position, so that it will project a beam of light on the driveway in back of the stalls.

Inasmuch as vending concessions are permitted in many drive-in theatres, the illuminating device 13 is provided with means for giving a distinctive signal in order to attract the attention of an attendant for service. One form of signalling means comprises a transparent, colored slide 61 mounted on the exterior of the base 17 in a recess 63 provided therefor. The slide 61 is held in place loosely by means of screws or bolts 65 and washers 67 so that it may be moved in a horizontal plane from either side of the housing 13, as indicated by the arrows 68 in Figure 6. The slide 61 is also provided with a centrally disposed aperture 69 which is in registry with the aperture 43 when the slide is in its normal operating position and thereby permits unfiltered light to pass when service is not desired. The slide 61 is further provided with an extension 71 along one longitudinal edge thereof which functions as a stop to limit movement of the slide. When the slide 61 is moved an amount sufficient to displace the opening 69 with respect to the aperture 43, the slide will intercept the light beam, with the result that the light projected through the aperture 43 will be filtered through the transparent, colored slide and a colored beam of light will be cast toward the ground signifying that service is desired from the concession attendant.

The signal slide may also be arranged to provide a variety of signals, such, for example, as the modified form of signal slide 73 illustrated in Figure 7 of the drawing is capable of providing. The slide 73 comprises a non-transparent member which is structurally similar to the slide 61 except that it has three aligned apertures 75, 77, 79. The center aperture 77 permits light to pass unfiltered like the center apertures 69 in the first embodiment, while the other two apertures 75, 79 have colored filter discs 81, 83 inserted therein. The filter colors may either be the same in both of the outside apertures 75, 79, or they may be of different colors, like the red filter disc 81 and the blue filter disc 83 illustrated in Figure 7, in order to more specifically designate the patrons desiring service. In the latter case, the slide is arranged to be operated in a predetermined direction for each signal light, such as that indicated by either of the arrows 85 in Figure 7, to thereby distinctly point out the patron desiring service.

While the signal slides 61, 73 thus far described are intended to be operated manually, it is conceivable that other means of operating the slide may be provided. For example, as illustrated in Figure 8, a magnetic device in the form of a solenoid 87 may be attached to the housing base 17 by means of the same bolts 65 which hold the slide on the base. A signal slide 89 having end portions 91, 93 extending at right angles to the main body portion is provided in place of the elongated, flat slides 61, 73 shown in Figures 4 through 7. The end portion 91 has an extension 95 which is engaged by the armature 97 of the solenoid 87 so that the slide 89 will move in response to movement of the armature 87. A spring 99 is attached to the other end portion 93 for the purpose of restoring and maintaining the slide 89 in its normal position when service is not desired and the solenoid is not energized. In the event service is desired, the patron operates a switch (not shown) which is connected to the solenoid 87 by means of leads 101 and a suitable electrical energy source, thereby causing the solenoid to be energized and the armature 97 to be moved in a manner well known in the art. Thus, the slide 89 will be moved to the extent necessary to displace a central aperture 103 provided therein from the path of the downwardly projected light beam, and a second aperture 105 having a colored light filter therein will be brought into the light beam path to thereby provide a distinctive signal which will attract the concession attendant.

Still another method of signalling the concession attendant may be provided in the form of an electrical device as illustrated in Figure 9. This type of signalling device employs separate and distinct light sources 107, 109 for the light beams indicated by arrows 111, 113, respectively, the light sources being shielded from each other by any suitable means such as the shield 115. In this case, the light source 109 is intended to be used for signalling the concession attendant by varying the intensity of the light beam 113. This is accomplished by introducing a suitable resistance element 117 in the electrical circuit 119 connecting the light source 109 to a source of electrical energy 121. A switch 123 is in shunt with the resistance element 117 so that, when service is desired, a patron operates the switch to cause an increase or decrease, as the case might be, in the intensity of the light beam 113.

For the convenience of the patrons, the electrical switches which operate the signaling devices illustrated in Figures 8 and 9 may be provided on the loudspeaker devices which are placed within the automobile.

As pointed out above, the illuminating device may conveniently be used with a loudspeaker system which employs individual loudspeakers for placement in the respective automobiles as disclosed in the above-identified, copending Phyfe application. In this event, the illuminating device is provided with a wire basket on each side of the housing 13 for receiving the loudspeakers when not in use. Each basket has a pair of wire extremities 125 which are inserted in apertures 127 in the housing base 17, the extremities being securely held in place by the housing cover 19. The terminal board 25 within the housing 13, which has electrical connections for the light source 28, may also provide suitable connections for the loudspeakers which are connected into the sound system through an audio frequency transformer 129, also located within the housing 13 and mounted on the base 17.

From the foregoing description, it will be apparent that the improved illuminating device provided by our present invention is adapted to accomplish three functions, namely: first, it will project a spot of light into the driveway and thereby provide adequate illumination for drivers seeking a parking space; second, it will provide illumination for each speaker station thereby acting as a marker to facilitate parking adjacent thereto; and third, it will provide a means for signalling or attracting the attention of a concession attendant. In addition thereto, the illuminating device is not only readily accessible for the purpose of servicing, but it requires comparatively little maintenance during periods when the theatre is not operating.

While the illuminating device described herein provides for two beams of light, one downward and one at an acute angle thereto, it may be arranged to project light downwardly, as well as forwardly and backwardly, as illustrated in Figure 3 of the drawings, and instead of a common light source being provided for the several functions, separate light sources may be provided for each function. Persons skilled in the art will, of course, recognize that other modifications and changes will readily suggest themselves. Therefore, we desire that the particular form of our invention described herein shall be considered as illustrative and not as limiting.

What is claimed is:

1. In a drive-in theatre having alternate rows of driveways and parking lanes including a plurality of automobile stalls, a combined illuminating system for said driveways and markers for said stalls comprising a plurality of light source stations disposed at spaced intervals in said parking lanes between adjacent stalls thereof, each of said stations including (1) a housing, (2) a light source in said housing, (3) means on said housing for projecting from said light source onto a selected area of an adjacent driveway a light spot, said spots being spaced along the respective driveways in correspondence with their respectively associated stations, and (4) means on said housing for projecting a light spot from said light source onto an area of ground beneath said housing.

2. An illuminating system for automobile drive-in theatres having alternate rows of automobile driveways and inclined stalls comprising a plurality of stations separate ones of which are disposed between adjacent pairs of said stalls, each of said stations comprising a support, an illuminating device mounted on said support and comprising a housing, means mounted within said housing providing a source of light, and means on said housing for projecting separate light beams from said source, one downwardly to illuminate an area beneath said housing, and another at an acute angle to said first mentioned light beam toward an adjacent one of said driveways to illuminate an area thereof.

3. The invention set forth in claim 2 wherein said housing is provided with separate openings in the lower portion thereof, and wherein said means for projecting said separate light beams comprises a lens mounted within each of said openings.

4. The invention set forth in claim 3 wherein one of said lenses is so disposed that its axis extends substantially vertically and the other of said lenses is so disposed that its axis extends at an acute angle to said first mentioned axis and intersects the latter at a point within said housing.

5. The invention set forth in claim 4 wherein said light source means is disposed substantially at the point of intersection of the axes of said lenses.

6. The invention as set forth in claim 5 wherein said light source means is adjustable with respect to said lenses.

7. A combined illuminating and signalling device for automobile drive-in theatres, said device comprising a housing, means within said housing providing a light source therein, means on said housing for projecting a pair of light beams downwardly from said source in two separate directions, one of said light beams being directed to a selected area of ground to illuminate said area, and means associated with said other light beam for controlling at will the transmission characteristic thereof to thereby provide a distinctive signal.

8. The invention set forth in claim 7 wherein said means for controlling the transmission characteristic of said other light beam comprises a manually operated slide attached to said housing and being adapted to intercept said other light beam.

9. The invention set forth in claim 7 wherein said means for controlling the transmission characteristic of said other light beam comprises a slide attached to said housing for intercepting the path of said other light beam, and wherein magnetic means is provided on said housing for operating said slide.

10. The invention set forth in claim 7 wherein said light source means comprises separate and distinct light sources for projecting each of said light beams, and wherein electrical means is associated with one of said light sources for altering the amount of illumination provided for said other light beam.

11. A combined illuminating and signalling device for automobile drive-in theatres, said device comprising a housing, means within said housing providing a light source therein, means on said housing for projecting a pair of light beams from said source in two separate directions, one of said light beams serving to illuminate a selected area of ground, and means movably disposed for movement into and out of the path of said other light beam at will for changing the transmission characteristic of said other beam to thereby provide a distinctive signal.

12. The invention set forth in claim 11 wherein said housing comprises a base and a cover removably mounted on said base, said housing being provided with separate openings in the lower portion thereof, and wherein said means for projecting said pair of light beams comprises a lens mounted within each of said openings.

13. The invention set forth in claim 12 wherein one of said lenses is so disposed that its axis extends substantially vertically and the other of said lenses is so disposed that its axis extends at an acute angle to said first mentioned axis and intersects the latter at a point within said housing.

14. The invention as set forth in claim 13 wherein said light source is common to both of said lenses and is disposed substantially at the point of intersection of said lens axes.

References Cited in the file of this patent

UNITED STATES PATENTS

| Number | Name | Date |
| --- | --- | --- |
| 1,650,347 | Hamilton | Nov. 22, 1927 |
| 1,711,534 | King | May 7, 1929 |
| 2,004,888 | Cahill | June 11, 1935 |
| 2,016,467 | Van Toll | Oct. 8, 1935 |
| 2,273,026 | Dircksen | Feb. 17, 1942 |
| 2,463,339 | Wetzel | Mar. 1, 1949 |
| 2,465,426 | Bralove | Mar. 29, 1949 |